US012764746B2

(12) United States Patent
Li

(10) Patent No.: US 12,764,746 B2
(45) Date of Patent: Oct. 13, 2026

(54) REPORTING METHOD FOR USER EQUIPMENT ASSISTANCE INFORMATION, USER EQUIPMENT, AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 478 days.

(21) Appl. No.: 18/003,914

(22) PCT Filed: Jun. 29, 2020

(86) PCT No.: PCT/CN2020/098923
§ 371 (c)(1),
(2) Date: Dec. 29, 2022

(87) PCT Pub. No.: WO2022/000188
PCT Pub. Date: Jan. 6, 2022

(65) Prior Publication Data

US 2023/0262706 A1 Aug. 17, 2023

(51) Int. Cl.

| | |
|---|---|
| ***H04W 72/21*** | (2023.01) |
| ***H04W 36/00*** | (2009.01) |
| ***H04W 72/231*** | (2023.01) |
| ***H04W 72/51*** | (2023.01) |

(52) U.S. Cl.
CPC ..... *H04W 72/21* (2023.01); *H04W 36/00838* (2023.05); *H04W 72/231* (2023.01); *H04W 72/51* (2023.01)

(58) Field of Classification Search
CPC ........... H04W 72/21; H04W 36/00838; H04W 72/231; H04W 72/51; H04W 36/08; H04W 8/24; Y02D 30/70; G06F 9/5016; G06F 9/5027
See application file for complete search history.

(56) References Cited

U.S. PATENT DOCUMENTS

| | | | | |
|---|---|---|---|---|
| 9,578,584 B1 | | 2/2017 | Oroskar et al. | |
| 2002/0013914 A1 | * | 1/2002 | Posch .................... | G06K 19/07 713/600 |
| 2007/0242647 A1 | * | 10/2007 | Bennett ................ | H04W 88/04 370/338 |
| 2010/0091734 A1 | * | 4/2010 | Park ..................... | H04W 92/20 370/331 |

(Continued)

FOREIGN PATENT DOCUMENTS

| | | |
|---|---|---|
| CN | 102402411 A | 4/2012 |
| CN | 109769207 A | 5/2019 |

(Continued)

*Primary Examiner* — Kiet Tang
(74) *Attorney, Agent, or Firm* — McCoy Russell LLP

(57) ABSTRACT

A reporting method includes: a user equipment (UE) providing computation capability resource assistance information of the UE to a network device. The computation capability resource assistance information may be carried in a MAC control element (MAC CE) or radio resource control (RRC) signaling, and the computation capability resource assistance information of the UE may be provided to the network device through a control channel carrying the MAC CE or the RRC signaling.

18 Claims, 2 Drawing Sheets

(56) References Cited

U.S. PATENT DOCUMENTS

| | | | | |
|---|---|---|---|---|
| 2010/0323753 | A1* | 12/2010 | Imamura | H04B 7/0689 455/552.1 |
| 2011/0216681 | A1* | 9/2011 | Tao | H04W 52/02 370/311 |
| 2012/0263060 | A1* | 10/2012 | Suzuki | H04W 72/0473 370/254 |
| 2014/0208384 | A1 | 7/2014 | Youssefian et al. | |
| 2019/0042488 | A1* | 2/2019 | Guim Bernat | G06F 9/505 |
| 2022/0085949 | A1* | 3/2022 | Shi | H04L 5/0023 |
| 2023/0075039 | A1* | 3/2023 | Li | H04W 28/0263 |

FOREIGN PATENT DOCUMENTS

| | | | |
|---|---|---|---|
| CN | 110851529 | A | 2/2020 |
| WO | 2019212681 | A1 | 11/2019 |

* cited by examiner

REPORTING METHOD FOR USER EQUIPMENT ASSISTANCE INFORMATION, USER EQUIPMENT, AND STORAGE MEDIUM

CROSS REFERENCE TO RELATED APPLICATION

The present application is a U.S. National Phase of International Application No. PCT/CN2020/098923 entitled "REPORTING METHOD AND APPARATUS FOR USER EQUIPMENT ASSISTANCE INFORMATION, USER EQUIPMENT, AND STORAGE MEDIUM," and filed on Jun. 29, 2020. The entire contents of each of the above-listed applications are hereby incorporated by reference for all purposes.

BACKGROUND

At present, there are more and more mobile applications based on artificial intelligence (AI)/machine learning (ML), but the applications based on AI/ML have characteristics of intensive computation, memory consumption and large power consumption. In the meantime, user equipment (UE) usually has a strict limit on energy consumption, computation and memory cost. Many AI/ML application programs are currently intended to unload an inference procedure to an Internet data center (IDC) from a mobile device. In this case, AI/ML operation needs to be separated on the user equipment and the network. The user equipment is clearer about behaviors of a user, resources on the user equipment side may be statistically calculated and evaluated according to the user behaviors of the user, so the user equipment may provide assistance information for a network device, and thus it will help a split scheduler to better perform parameter configuration for selecting a best AI/ML split mode and a best split point. Unfortunately, there is no related art for reference at present.

SUMMARY

According to a first aspect of an example of the disclosure, a reporting method for user equipment assistance information is provided and includes:

providing, by UE, computation capability resource assistance information of the UE to a network device.

According to a second aspect of an example of the disclosure, a user equipment is provided and includes a processor, a transceiver, a memory and an executable program stored on the memory and capable of being run by the processor, in which the processor is configured to:

provide computation capability resource assistance information of the UE to a network device.

According to a third aspect of an example of the disclosure, a non-transitory storage medium is provided and stores an executable program, in which the executable program, when executed by a processor, implements the following step:

provide computation capability resource assistance information of the UE to a network device.

It is to be understood that the above general description and the following detailed description are explanatory as examples rather than limit the examples of the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the examples of the disclosure.

DETAILED DESCRIPTION

The examples will be described in detail here, and their instances are represented in the accompanying drawings. Unless otherwise indicated, when the following description refers to the accompanying drawings, the same number in the different accompanying drawings represents the same or similar elements. Implementations described in the following examples do not represent all implementations consistent with the examples of the disclosure. Rather, they are examples of an apparatus and method consistent with some aspects of the examples of the disclosure as detailed in appended claims.

Terms used in the examples of the disclosure are intended to describe specific examples instead of aiming at limiting the examples of the disclosure. The singular such as "a/an", "the" and "said" used in the examples of the disclosure and appended claims also intends to include a plural form unless other meanings are clearly indicated in context. It is to be further understood that a term "and/or" used here refers to and contains any one or all possible combinations of one or more associated listed items.

It is to be understood that various information, possibly described by using terms such as first, second and third in the examples of the disclosure, is not supposed to be limited to these terms. These terms are used for distinguishing information of the same type. For example, without departing from the scope of the examples of the disclosure, first information may be also called second information, and similarly, the second information may be also called the first information. Depending on the context, a word "if" used here may be constructed as "during . . . ", "when . . . " or "in response to determining".

Figure 1:
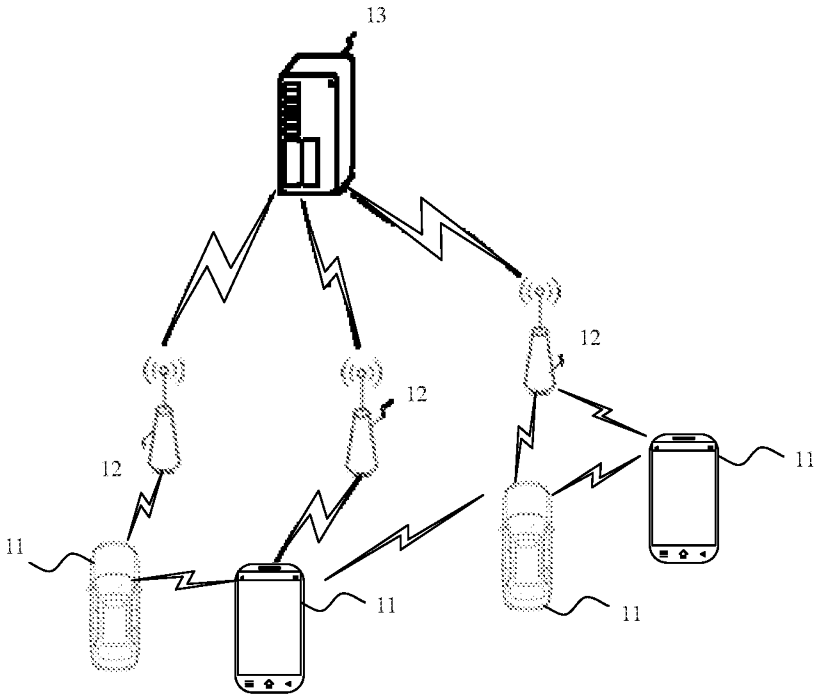
FIG. 1 is a schematic structural diagram of a wireless communication system shown according to an example.

Please refer to FIG. 1, which shows a schematic structural diagram of a wireless communication system provided by an example of the disclosure. As shown in FIG. 1, the wireless communication system is a communication system based on a cellular mobile communication technology and may include: a plurality of terminals 11 and a plurality of base stations 12.

The terminal 11 may refer to a device providing a voice and/or data connectivity for a user. The terminal 11 may communicate with one or more core networks via a radio access network (RAN). The terminal 11 may be an Internet of Things terminal, such as a sensor device, a mobile phone (or called a "cell" phone) and a computer with the Internet of Things terminal, for example, the terminals may be a fixed, portable, pocket, hand-held, computer built-in or on-board apparatus. For example, the terminals may be a station (STA), a subscriber unit, a subscriber station, a mobile station, a mobile, a remote station, an access point, a remote terminal, an access terminal, a user terminal, a user agent, a user device, or user equipment (UE). Or the terminal

11 may also be a device of an unmanned aerial vehicle. Or the terminal 11 may also be an on-board device, for example, may be a trip computer with a wireless communication function, or a wireless communication device externally connected with the trip computer. Or the terminal 11 may also be a road-side infrastructure, for example, may be a street lamp, a signal lamp or other road-side infrastructures with the wireless communication function.

The base station 12 may be a network side device in the wireless communication system. The wireless communication system may be the 4th generation (4G) mobile communication system, also called a long term evolution (LTE) system; or the wireless communication system may also be a 5G system, also called a new radio (NR) system or a 5G NR system. Or the wireless communication system may also be a next generation system of the 5G system. An access network in the 5G system may be called a new generation-radio access network (NG-RAN), or the wireless communication system may be an MTC system.

The base station 12 may be an evolution base station (eNB) adopted in the 4G system. Or the base station 12 may also be a base station (gNB) adopting a centralized distributed architecture in the 5G system. When adopting the centralized distributed architecture, the base station 12 usually includes a central unit (CU) and at least two distributed units (DU). Protocol stacks of a packet data convergence protocol (PDCP) layer, a radio link control (RLC) protocol layer and a media access control (MAC) layer are arranged in the central unit, a physical (PHY) layer protocol stack is arranged in the distributed units, and the examples of the disclosure do not limit a specific implementation of the base station 12.

A wireless connection may be established between the base station 12 and the terminal 11 through a wireless air interface. In different implementations, the wireless air interface is a wireless air interface based on a fourth generation (4G) mobile communication network technology standard; or the wireless air interface is a wireless air interface based on a fifth generation (5G) mobile communication network technology standard, for example, the wireless air interface is a new radio; or the wireless air interface may also be a wireless air interface based on a next generation mobile communication network technology standard of 5G.

In some examples, an end to end (E2E) connection may also be established between the terminals 11. For example, there are scenes of vehicle to vehicle (V2V) communication, vehicle to infrastructure (V2I) communication and vehicle to pedestrian (V2P) communication and the like in vehicle to everything (V2X) communication.

In some examples, the above wireless communication system may also contain a network management device 13.

The plurality of base stations 12 are connected with the network management device 13 respectively. The network management device 13 may be a core network device in the wireless communication system, for example, the network management device 13 may be a mobility management entity (MME) in an evolved packet core (EPC). Or the network management device may also be other core network devices, for example, a serving gateway (SGW), a public data network gateway (PGW), a policy and charging rules function (PCRF) unit or a home subscriber server (HSS), etc. The examples of the disclosure do not limit an implementation form of the network management device 13.

An executive body involved in the examples of the disclosure includes but is not limited to: user equipment (UE) in the cellular mobile communication system, a base station of cellular mobile communication, etc.

Figure 2:
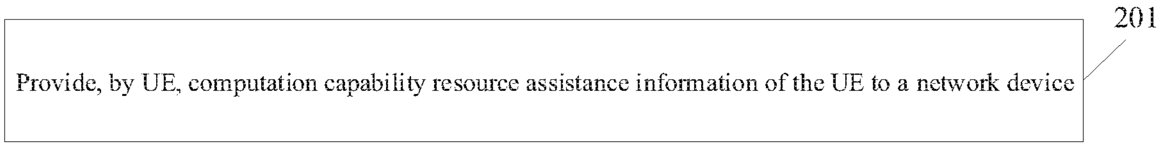
FIG. 2 is a schematic flowchart of a reporting method for user equipment assistance information shown according to an example.

FIG. 2 is a schematic flowchart of a reporting method for user equipment assistance information shown according to an example. As shown in FIG. 2, the reporting method for user equipment assistance information of the example of the disclosure includes the following processing steps.

Step 201, UE provides computation capability resource assistance information of the UE to a network device.

In the example of the disclosure, the computation capability resource assistance information of the UE includes at least one piece of the following information:

- information about a current remaining amount of computation capacity of the UE, in which the information about the current remaining amount of the computation capacity is determined based on processing capacity of a processor of the UE, a memory size, a current memory remaining amount, a proportion which the memory remaining amount accounts for of a total memory, a processing frequency of a CPU, a CPU remaining amount, a proportion which the CPU remaining amount accounts for of a total CPU, how many times the current CPU remaining amount can provide addition and multiplication operation etc., and the current processing capacity being occupied or about to be occupied;
- a current electric quantity remaining amount of the UE;
- a remaining amount of computation capacity on the UE side that the UE expects or estimates to consume for accessing of current AI/ML model training, in which the UE may estimate the remaining amount of the computation capacity that the UE will consume based on accessing of current AI/ML model training, that is, the UE itself estimates the corresponding remaining amount of the computation capacity for AI/ML; or
- an electric quantity consumption remaining amount of the UE side expected or estimated by the UE for accessing of current AI/ML model training.

In an example, the information about the remaining amount of the computation capacity and the remaining amount of the computation capacity on the UE side that the UE expects or estimates to consume are indicated in a mode of percentage or level; and

- the electric quantity remaining amount and the electric quantity consumption remaining amount are indicated in a mode of percentage or level.

In step 201, providing, by the UE, the computation capability resource assistance information of the UE to the network device includes: the UE carries the computation capability resource assistance information in a MAC control element (MAC CE) or radio resource control (RRC) signaling, and provides the computation capability resource assistance information of the UE to the network device through a control channel carrying the MAC CE or the RRC signaling.

As an implementation, the computation capability resource assistance information of the UE may be carried by adding a new MAC CE or an RRC message. For example, as an implementation, in order to reduce signaling overhead, a corresponding relationship between a reporting quantity range and codepoints may be regulated in a protocol, and the UE reports merely the corresponding codepoints. For example, 0 is reported for 0-10%, 1 is reported for 10%-20%, 3 is reported for 20%-40%, and the like.

In the example of the disclosure, the method further includes the following steps.

Under the condition that handover of the UE occurs, the UE carries the computation capability resource assistance information of the UE in a handover request message, and sends the computation capability resource assistance information to a target network device through a source network device.

Further, under the condition that the handover of the UE occurs, the UE sends the computation capability resource assistance information of the UE to a source network device within a duration T before receiving a handover instruction, and sends the computation capability resource assistance information of the UE to a target network device after being handed over to the target network device. The duration T here may be 1 second, 0.5 second, 1.5 seconds or the like.

As an implementation means, the duration T is a preset duration configured in the UE; or the UE is notified of the duration T through a downlink message.

In the example of the disclosure, the method further includes:

the UE monitors configuration information sent by the network device, and sends at least one piece of the following information to the network device according to an indication of the configuration information:

information about a current remaining amount of computation capacity of the UE;

a current electric quantity remaining amount of the UE;

a remaining amount of computation capacity on the UE side that the UE expects or estimates to consume for accessing of current AI/ML model training; or an electric quantity consumption remaining amount of the UE side expected or estimated by the UE for accessing of current AI/ML model training.

In other words, the UE performs reporting of its own computation capability resource assistance information merely after receiving a computation capability resource assistance information reporting instruction sent by the network device.

As an implementation means, in the example of the disclosure, the method further includes:

the UE monitors control signaling sent by the network device, and an own reporting function for the computation capability resource assistance information is enabled or forbidden based on an indication of the control signaling.

In other words, the network device may enable or disenable the reporting function for the computation capability resource assistance information of the UE according to demands, for it is considered that when the UE autonomously reports its own computation capability resource assistance information, if a large quantity of UE report the computation capability resource assistance information in some set periods of time, the network device will have a large burden, at the moment, an instruction for closing the reporting function for computation capability resource assistance information may be sent to some UE, and thus some UE do not need to report the computation capability resource assistance information when the network device is busy.

According to the reporting method for the user equipment assistance information provided by the example of the disclosure, the user equipment carries the own computation capability resource assistance information (such as information about the remaining amount of the computation capacity, the current electric quantity remaining amount, the remaining amount of the computation capacity on the UE side that the UE expects or estimates to consume for accessing of current AI/ML model training, and the electric quantity consumption remaining amount of the UE side expected or estimated for accessing of current AI/ML model training) in the MAC CE or the radio resource control (RRC) signaling, and sends the computation capability resource assistance information to the network device through the control channel carrying the MAC CE or the RRC signaling. When the network device performs AI/ML operation based on the computation capability resource assistance information reported by the UE, an operation adapted to the computation capability resource assistance information reported by the UE can be allocated to the UE, so that the UE can quickly complete the operation based on its own computation capability, and can thus better cooperate with the network device to achieve an AI/ML inference task.

In general, a key to splitting the AI/ML operation is to select a best split mode and a best split point, so as to guarantee that needed resources are lower than an upper limit of available resources on a mobile device, computing, storage/memory and power consumption are optimized, and communication resources of the equipment and the network device are a key technology of AI/ML. The AI/ML operation may be executed by a split scheduler of an independently deployed network element node, and a network element may also be deployed on a base station node or a core network node. From the perspective of the network element node, available resources of the UE are a multi-dimension concept.

Specifically, the UE provides the computation capability resource assistance information to the base station. The computation capability resource assistance information of the UE includes as follows: the current remaining amount of computation capacity of a terminal: memory/CPU/storage occupation conditions, which may be measured by percentage; the current electric quantity remaining amount of the terminal, which may also be measured by percentage; the remaining amount of the computation capacity on the terminal side that the terminal expects or estimates to consume (may be measured by percentage) for accessing of AI/ML model training this time: memory/CPU/storage occupation conditions; and the electric quantity consumption remaining amount (may be measured by percentage) of the terminal side expected or estimated by the terminal for accessing of AI/ML model training this time.

The above reported information may also be reported in a mode of indication such as a high indication, a medium indication and a low indication besides being measured by percentage.

The UE will report the assistance information to the base station, and specific reporting signaling is the MAC CE or the RRC signaling, for example, a new MAC CE or an RRC message needs to be added to carry the computation capability resource assistance information of the UE. In order to reduce signaling overhead, a corresponding relationship between a reporting quantity range and codepoints may be regulated in a protocol, and the UE reports merely the corresponding codepoints. For example, 0 is reported for 0-10%, 1 is reported for 10%-20%, and the like.

When handover occurs, the computation capability resource assistance information of the UE is transferred to a target base station from a source base station through the handover request message. If the UE sends the assistance information to the source base station during the final duration T before receiving the handover instruction, at the moment, the UE will send the assistance information again after being handed over to a target cell. At the moment, there is not enough time to transfer the computation capability resource assistance information of the UE to the target base station from the source base station, so the UE needs to send the assistance information again after being handed over to the target cell. The duration T may be regulated based on a protocol, for example, 1s. The assistance information sent again may be an original message to be resent, or a new updated message.

In the example of the disclosure, the base station may configure the UE to report a certain type of the assistance information or simultaneously report various types of assistance information, that is, other assistance information may also be carried when the UE reports the computation capability resource assistance information. The base station may allow the UE to report the computation capability resource assistance information or forbid the UE from doing so by sending the control signaling. In order to forbid the terminal from frequently reporting the assistance information, a forbidding timer may be adopted, for example, the UE may be set to report after the forbidding timer does not run any more or to report when the forbidding timer overruns; or a reporting period may be configured for the UE, and when the reporting period comes, the UE reports the computation capability resource assistance information. Or, the computation capability resource assistance information is reported through event trigger, for example, reporting is performed when a measurement signal power value reaches a certain threshold.

Figure 3:
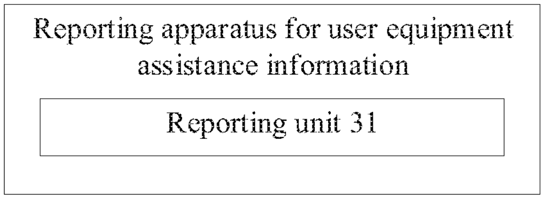
FIG. 3 is a schematic structural diagram of a reporting apparatus for user equipment assistance information shown according to an example.

FIG. 3 is a schematic structural diagram of a reporting apparatus for user equipment assistance information shown according to an example. As shown in FIG. 3, the reporting apparatus for the user equipment assistance information of the example of the disclosure includes:

a reporting unit 31, configured to provide computation capability resource assistance information of user equipment (UE) to a network device.

In an example, the reporting unit 31 is configured to carry the computation capability resource assistance information in a MAC CE or RRC signaling, and provide the computation capability resource assistance information of the UE to the network device through a control channel carrying the MAC CE or the RRC signaling.

In an example, the reporting unit 31 is further configured to:

carry the computation capability resource assistance information of the UE in a handover request message when handover occurs, and send the computation capability resource assistance information to a target network device through a source network device.

In an example, the reporting unit 31 is further configured to:

send the computation capability resource assistance information of the UE to a source network device within a duration T before the UE receives a handover instruction, and send the computation capability resource assistance information of the UE to a target network device after being handed over to the target network device.

In an example, the duration T is a preset duration configured in the UE; or the UE is notified of the duration T through a downlink message.

In an example, the computation capability resource assistance information of the UE includes at least one piece of the following information:

information about a current remaining amount of computation capacity of the UE;

a current electric quantity remaining amount of the UE;

a remaining amount of computation capacity on the UE side that the UE expects or estimates to consume for accessing of current artificial intelligence (AI)/machine learning (ML) model training; or an electric quantity consumption remaining amount of the UE side expected or estimated by the UE for accessing of current AI/ML model training.

In an example, information about the remaining amount of the computation capacity and the remaining amount of the computation capacity on the UE side that the UE expects or estimates to consume are indicated in a mode of percentage or level; and the electric quantity remaining amount and the electric quantity consumption remaining amount are indicated in a mode of percentage or level.

Based on the reporting apparatus for the user equipment assistance information shown in FIG. 3, the reporting apparatus for the user equipment assistance information of the example of the disclosure further includes:

a first monitoring unit (not shown in FIG. 3), configured to monitor configuration information sent by the network device; and the reporting unit 31 is further configured to send at least one piece of the following information to the network device according to an indication of the configuration information:

information about a current remaining amount of computation capacity of the UE;

a current electric quantity remaining amount of the UE;

a remaining amount of computation capacity on the UE side that the UE expects or estimates to consume for accessing of current artificial intelligence (AI)/machine learning (ML) model training; or an electric quantity consumption remaining amount of the UE side expected or estimated by the UE for accessing of current AI/ML model training.

Based on the reporting apparatus for the user equipment assistance information shown in FIG. 3, the reporting apparatus for the user equipment assistance information of the example of the disclosure further includes:

a second monitoring unit (not shown in FIG. 3), configured to monitor control signaling sent by the network device; and a reporting enabling unit (not shown in FIG. 3), configured to enable an own reporting function for the computation capability resource assistance information or forbid the own reporting function for the computation capability resource assistance information based on an indication of the control signaling.

In an example, the reporting unit 31, the first monitoring unit, the second monitoring unit, the reporting enabling unit and the like may be implemented by one or more than one central processing units (CPU), graphics processing units (GPU), baseband processors (BP), application specific integrated circuits (ASIC), DSPs, programmable logic devices (PLD), complex programmable logic devices (CPLD), field-programmable gate arrays (FPGA), general-purpose processors, controllers, micro controller units (MCU), microprocessors or other electronic elements, and may also be implemented by combining one or more radio frequency (RF) antennas for executing the above reporting method for the user equipment assistance information.

In the example of the disclosure, specific means of executing operation by all units in the reporting apparatus for the user equipment assistance information shown in FIG. 3 have been described in detail in the example of the method and will not be set forth in detail here.

Figure 4:
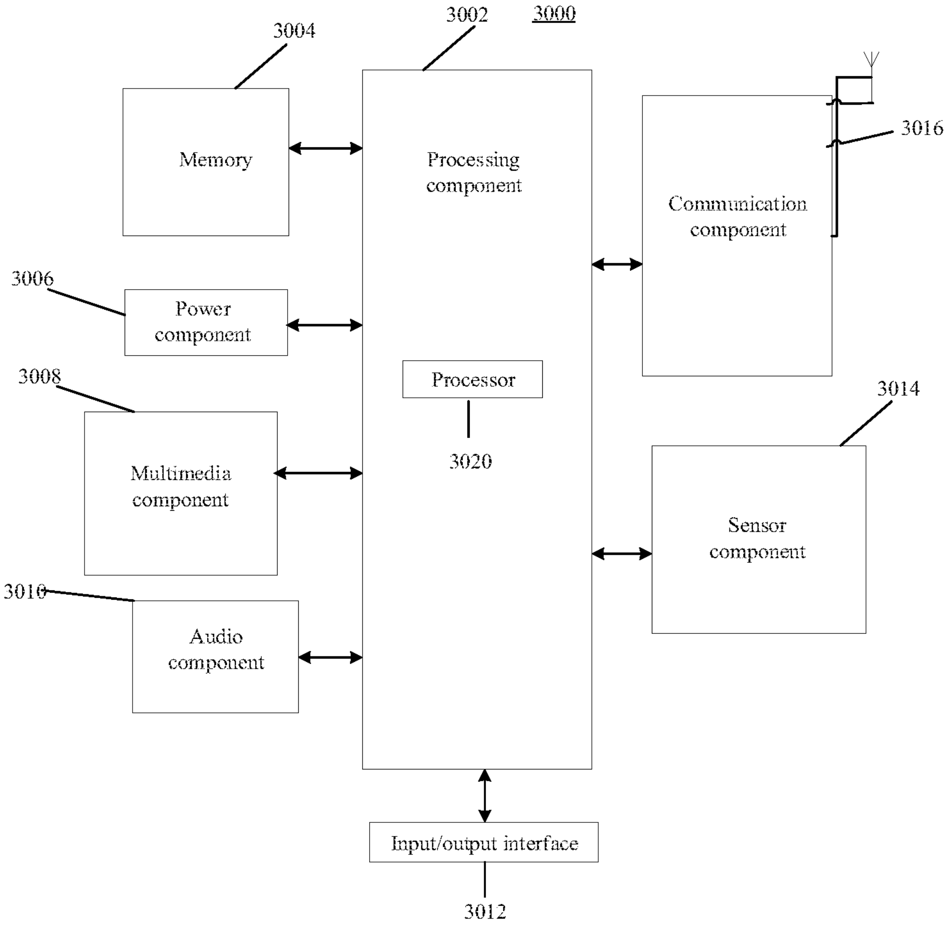
FIG. 4 is a schematic structural diagram of constitution of user equipment shown according to an example.

FIG. 4 is a block diagram of user equipment 3000 shown according to an example. For example, the user equipment 3000 may be a mobile phone, a computer, a digital broadcast terminal, a messaging transceiving device, a game console, a tablet device, a medical device, a fitness facility, a personal digital assistant and the like.

Referring to FIG. 4, the user equipment 3000 may include one or more components as follows: a processing component 3002, a memory 3004, a power component 3006, a multimedia component 3008, an audio component 3010, an input/output (I/O) interface 3012, a sensor component 3014 and a communication component 3016.

The processing component 3002 generally controls whole operation of the user equipment 3000, such as operations related to display, phone call, data communication, camera operation and recording operation. The processing component 3002 may include one or more processors 3020 for executing instructions so as to complete all or part of steps of the above method. Besides, the processing component 3002 may include one or more modules to facilitate interaction between the processing component 3002 and the other components. For example, the processing component 3002 may include a multimedia module so as to facilitate interaction between the multimedia component 3008 and the processing component 3002.

The memory 3004 is configured to store various types of data so as to support operation on the user equipment 3000. Examples of these data include instructions of any application program or method for operation on the user equipment 3000, contact person data, telephone directory data, messages, pictures, videos and the like. The memory 3004 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 3006 provides power for various components of the user equipment 3000. The power component 3006 may include a power management system, one or more power sources, and other components related to power generation, management and distribution for the user equipment 3000.

The multimedia component 3008 includes a screen which provides an output interface between the user equipment 3000 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 3008 includes a front camera and/or a back camera. When the equipment 3000 is in an operation mode, such as a photographing mode or a video mode, the front camera and/or the back camera can receive external multimedia data. Each front camera and each back camera may be a fixed optical lens system or have a focal length and an optical zoom capability.

The audio component 3010 is configured to output and/or input an audio signal. For example, the audio component 3010 includes a microphone (MIC). When the user equipment 3000 is in the operation mode, such as a call mode, a recording mode and a voice recognition mode, the microphone is configured to receive an external audio signal. The received audio signal may be further stored in the memory 3004 or sent via the communication component 3016. In some examples, the audio component 3010 further includes a speaker for outputting the audio signal.

The I/O interface 3012 provides an interface between the processing component 3002 and a peripheral interface module, and the above peripheral interface module may be a keyboard, a click wheel, buttons and the like. These buttons may include but are not limited to: a home button, a volume button, a start button and a lock button.

The sensor component 3014 includes one or more sensors, configured to provide state evaluation of various aspects for the user equipment 3000. For example, the sensor component 3014 may detect a start/shut-down state of the user equipment 3000 and relative positioning of the components, for example, the components are a display and a keypad of the user equipment 3000. The sensor component 3014 may further detect location change of the user equipment 3000 or one component of the user equipment 3000, whether there is contact between the user and the user equipment 3000, azimuth or speed up/speed down of the user equipment 3000 and temperature change of the user equipment 3000. The sensor component 3014 may include a proximity sensor, configured to detect existence of a nearby object without any physical contact. The sensor component 3014 may further include an optical sensor, such as a CMOS or CCD image sensor, for use in imaging application. In some examples, the sensor component 3014 may further include an acceleration sensor, a gyroscope sensor, a magnetic sensor, a pressure sensor or a temperature sensor.

The communication component 3016 is configured to facilitate wired or wireless communication between the user equipment 3000 and other devices. The user equipment 3000 may be accessed to a wireless network based on a communication standard, such as Wi-Fi, 2G or 3G, or their combination. In an example, the communication component 3016 receives a broadcast signal or broadcast-related information from an external broadcast management system via a broadcast channel In an example, the communication component 3016 further includes a near-field communication (NFC) module so as to facilitate short-range communication. For example, the NFC module may be implemented based on a radio frequency identification (RFID) technology, an infra-red data association (IrDA) technology, an ultra wide band (UWB) technology, a Bluetooth (BT) technology and other technologies.

In an example, the user equipment 3000 may be implemented by one or more than one application specific integrated circuits (ASIC), digital signal processors (DSP), digital signal processing devices (DSPD), programmable logic devices (PLD), field-programmable gate arrays (FPGA), controllers, micro control units, microprocessors or other electronic elements for executing the above reporting method for the user equipment assistance information.

In an example, a non-transitory computer-readable storage medium including instructions is further provided, such as a memory 3004 including the instructions. The above instructions may be executed by the processor 3020 of user equipment 3000 so as to complete the above reporting method for the user equipment assistance information. For example, the non-transitory computer-readable storage medium may be an ROM, a random access memory (RAM), a CD-ROM, a magnetic tape, a floppy disk, an optical data storage device and the like.

Those skilled in the art will easily figure out other implementation solutions of the examples of the disclosure after considering the specification and practicing the disclosure disclosed here. The disclosure intends to cover any transformation, uses or adaptive change of the examples of the disclosure which conforms to a general principle of the examples of the disclosure and includes common general knowledge or conventional technical means which are not disclosed by the examples of the disclosure in the technical field. The specification and the examples are regarded as examples.

It is to be understood that the examples of the disclosure are not limited to an accurate structure described above and shown in the accompanying drawings, and various modifications and changes can be made without departing from its scope.

The invention claimed is:

1. A reporting method for user equipment assistance information, comprising:

providing, by a user equipment (UE), computation capability resource assistance information of the UE to a network device;

wherein the computation capability resource assistance information of the UE comprises a remaining amount of computation capacity on the UE side that the UE expects or estimates to consume for accessing current artificial intelligence (AI)/machine learning (ML) model training; and wherein the reporting method further comprises:

reporting, by the UE, the computation capability resource assistance information after a forbidding timer stops running or expires.

2. The reporting method according to claim 1, wherein providing, by the UE, the computation capability resource assistance information of the UE to the network device comprises:

carrying, by the UE, the computation capability resource assistance information in a medium access control control element (MAC CE) or radio resource control (RRC) signaling, and providing the computation capability resource assistance information of the UE to the network device through a control channel carrying the MAC CE or the RRC signaling.

3. The reporting method according to claim 1, further comprising:

carrying, by the UE, the computation capability resource assistance information of the UE in a handover request message in response to determining that a handover occurs, and sending the computation capability resource assistance information to a target network device through a source network device.

4. The reporting method according to claim 1, further comprising:

sending, by the UE, the computation capability resource assistance information of the UE to a source network device within a duration T before receiving a handover instruction, and sending, by the UE, the computation capability resource assistance information of the UE to a target network device after being handed over to the target network device.

5. The reporting method according to claim 4, wherein the duration T is a preset duration configured in the UE, or the UE is notified of the duration T through a downlink message.

6. The reporting method according to claim 1, further comprising:

monitoring, by the UE, control signaling sent by the network device, and enabling its own reporting function for the computation capability resource assistance information or forbidding its own reporting function for the computation capability resource assistance information based on an indication of the control signaling.

7. The reporting method according to claim 1, wherein the computation capability resource assistance information of the UE further comprises at least one piece of the following information:

an electric quantity consumption remaining amount of the UE side expected or estimated by the UE for accessing the current AI/ML model training; or a current electric quantity remaining amount of the UE.

8. The reporting method according to claim 7, wherein the current remaining amount of the computation capacity and the remaining amount of the computation capacity on the UE side that the UE expects or estimates to consume are indicated in a mode of percentage or level; and the current electric quantity remaining amount and the electric quantity consumption remaining amount are indicated in a mode of percentage or level.

9. The reporting method according to claim 7, further comprising:

monitoring, by the UE, configuration information sent by the network device, and sending, by the UE, at least one piece of the following information to the network device according to an indication of the configuration information:

the current remaining amount of the computation capacity of the UE;

the current electric quantity remaining amount of the UE;

the remaining amount of the computation capacity on the UE side that the UE side expects or estimates to consume for accessing the current artificial intelligence (AI)/machine learning (ML) model training; or the electric quantity consumption remaining amount on the UE side that the UE expects or estimates for accessing the current AI/ML model training.

10. The reporting method according to claim 1, wherein the computation capability resource assistance information of the UE further comprises a current remaining amount of computation capacity of the UE, and the current remaining amount of computation capacity of the UE is determined by at least one of the following:

processing capacity of a processor of the UE;

a proportion of remaining memory to total memory;

a proportion of remaining central processing unit (CPU) resources to total CPU resources;

a number of addition and multiplication operations supported by current remaining CPU resources;

the current processing capacity being occupied; or the current processing capacity about to be occupied.

11. A user equipment (UE), comprising:

a processor;

a transceiver; and a memory storing an executable program that is capable of being run by the processor, wherein the processor is configured to:

provide computation capability resource assistance information of the UE to a network device;

wherein the computation capability resource assistance information of the UE comprises a remaining amount of computation capacity on the UE side that the UE expects or estimates to consume for accessing current artificial intelligence (AI)/machine learning (ML) model training; and wherein the processor is further configured to report the computation capability resource assistance information after a forbidding timer stops running or expires.

12. The UE according to claim 11, wherein the processor is further configured to:

carry the computation capability resource assistance information in a medium access control control element (MAC CE) or radio resource control (RRC) signaling, and provide the computation capability resource assistance information of the UE to the network device through a control channel carrying the MAC CE or the RRC signaling.

13. The UE according to claim 11, wherein the processor is further configured to:

carry the computation capability resource assistance information of the UE in a handover request message in response to determining that a handover occurs, and send the computation capability resource assistance information to a target network device through a source network device.

14. The UE according to claim 11, wherein the processor is further configured to:

send the computation capability resource assistance information of the UE to a source network device within a duration T before receiving a handover instruction, and send the computation capability resource assistance information of the UE to a target network device after the UE is handed over to the target network device.

15. The UE according to claim 14, wherein the duration T is a preset duration configured in the UE, or the UE is notified of the duration T through a downlink message.

16. The UE according to claim 11, wherein the processor is further configured to:

monitor control signaling sent by the network device, and enable its own reporting function for the computation capability resource assistance information or forbid its own reporting function for the computation capability resource assistance information based on an indication of the control signaling.

17. A non-transitory computer-readable storage medium, storing an executable program, wherein the executable program, when executed by a processor, causes the processor to:

provide computation capability resource assistance information of a user equipment (UE) to a network device;

wherein the computation capability resource assistance information of the UE comprises a remaining amount of computation capacity on the UE side that the UE expects or estimates to consume for accessing current artificial intelligence (AI)/machine learning (ML) model training; and wherein the processor is further configured to report the computation capability resource assistance information after a forbidding timer stops running or expires.

18. The non-transitory computer-readable storage medium according to claim 17, wherein the processor is further configured to:

carry the computation capability resource assistance information in a medium access control control element (MAC CE) or radio resource control (RRC) signaling, and provide the computation capability resource assistance information of the UE to the network device through a control channel carrying the MAC CE or the RRC signaling.

* * * * *